United States Patent
Devin

(10) Patent No.: US 6,933,764 B2
(45) Date of Patent: Aug. 23, 2005

(54) INTEGRATED CIRCUIT COMPRISING A VOLTAGE GENERATOR AND A CIRCUIT LIMITING THE VOLTAGE SUPPLIED BY THE VOLTAGE GENERATOR

(75) Inventor: Jean Devin, Le Tholonet (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 10/721,058

(22) Filed: Nov. 24, 2003

(65) Prior Publication Data

US 2004/0164788 A1 Aug. 26, 2004

(30) Foreign Application Priority Data

Nov. 26, 2002 (FR) .............................................. 02 14820

(51) Int. Cl.⁷ ................................................. H03K 5/08
(52) U.S. Cl. ...................................... 327/309; 327/326
(58) Field of Search ................................. 327/309, 318, 327/319, 320, 321, 322, 324, 325, 326, 327, 328, 333, 536, 584

(56) References Cited

U.S. PATENT DOCUMENTS

| | | | |
|---|---|---|---|
| 5,483,406 A | | 1/1996 | Bennett et al. ................ 361/56 |
| 5,642,072 A | * | 6/1997 | Miyamoto et al. ........... 327/535 |
| 5,859,797 A | * | 1/1999 | Maccarrone et al. ..... 365/185.25 |
| 5,978,192 A | * | 11/1999 | Young et al. .................. 361/56 |
| 6,154,082 A | * | 11/2000 | Bernard et al. .............. 327/310 |

FOREIGN PATENT DOCUMENTS

| | | |
|---|---|---|
| EP | 0 915 551 A2 | 5/1999 |
| FR | 2 741 756 A1 | 5/1997 |
| FR | 2 794 867 A1 | 12/2000 |

\* cited by examiner

*Primary Examiner*—Jeffrey Zweizig
(74) *Attorney, Agent, or Firm*—Lisa K. Jorgenson; E. Russell Tarleton; Seed IP Law Group PLLC

(57) ABSTRACT

An integrated circuit having a voltage generator supplying a determined voltage, a voltage-limiting circuit arranged at the output of the voltage generator, the voltage-limiting circuit having at least one PN junction formed by a diode-arranged MOS transistor, the PN junction having a breakdown voltage defining a threshold for triggering the voltage-limiting circuit as from which the PN junction is on by avalanche effect, at least one load in series with the PN junction for limiting an avalanche current passing through the PN junction when the PN junction is on, and at least one switch in parallel with the PN junction and the load, the switch arranged in the open state when the PN junction is off and to be in the closed state when the PN junction is on.

25 Claims, 3 Drawing Sheets

INTEGRATED CIRCUIT COMPRISING A VOLTAGE GENERATOR AND A CIRCUIT LIMITING THE VOLTAGE SUPPLIED BY THE VOLTAGE GENERATOR

BACKGROUND OF THE INVENTION

1. Field of the Invention

The present invention relates to an integrated circuit comprising a voltage generator and a circuit limiting the voltage supplied by the voltage generator.

2. Description of the Related Art

Booster circuits such as charge pumps allow an electric voltage higher than a determined supply voltage to be produced. In the field of integrated circuits, charge pumps for example are used to produce the high voltage Vpp for erasing and programming the floating-gate transistors of the electrically erasable and programmable memories (EEPROM, FLASH, FLASH-EEPROM . . . ).

FIG. 1 schematically represents a charge pump 1 supplying a boosted voltage Vpp to a load 2, here a capacitive load. This capacitive load is for example equal to the sum of the spurious gate capacitances of a plurality of floating-gate transistors to be erased or to be programmed simultaneously. The charge pump 1 is driven by clock signals S1, S2 in opposite phase delivered by an oscillator 3, and comprises a plurality of cascade-arranged pump stages the structure of which, well known by those skilled in the art, is not represented here. The charge pump 1 receives a supply voltage Vcc in the order of 2 to 5 volts at input. The amplitude of the voltage Vpp depends on the total number of cascade-arranged pump stages and is further proportional to the voltage Vcc.

The voltage Vpp is generally in the order of 10 to 20 volts and must not exceed a threshold Vppmax above which transistors to be erased or to be programmed could be damaged. Now, a charge pump is generally provided with a number of pump stages higher than the number of pump stages theoretically sufficient, so as to reduce the rise time of the voltage Vpp upon the activation of the charge pump. As a result, after a start period, the charge pump can deliver a voltage Vpp higher than the threshold Vppmax. Furthermore, the supply voltage Vcc can fluctuate considerably in relation to its nominal value taken into account at the time the charge pump is designed, and an increase in the voltage Vcc can lead to a corresponding increase in the voltage Vpp above the threshold Vppmax.

A control of the voltage Vpp must therefore be provided, so as not to exceed the threshold Vppmax.

As shown in FIG. 1, this control can be performed by a regulator 5 arranged at the output of the charge pump 1. The regulator 5 applies an on/off signal ON/OFF to the oscillator and stops the charge pump when the voltage Vpp reaches a pre-determined regulated value Vppreg, chosen lower than or equal to Vppmax, then restarts the pump when the voltage Vpp is below this value (on-off type regulation).

This solution is advantageous in terms of current consumption and flexibility of use, but a regulator has a relatively complex structure of a considerable size in terms of silicon surface occupied.

Another solution is to provide a simple voltage-limiting device at the output of the charge pump.

Thus, FIG. 2 represents a voltage-limiting device 6 comprising Zener diodes in series arranged between the output of the charge pump 1 and the ground, such as three Zener diodes 7, 8, 9 for example each having a threshold voltage in the order of 5V. The threshold voltage Vppmax of the voltage-limiting device is the sum of the threshold voltages of each of the diodes, such as 15V for example. This solution allows the active components of a regulator to be removed, but the Zener diodes themselves occupy a considerable surface area in an integrated circuit, and at least as large as the active components of a regulator. Furthermore, the manufacture thereof requires specific doping steps that penalise the cost price.

FIG. 3 represents a very simple solution in which the voltage Vpp is limited by a PN junction reverse arranged between the output of the charge pump and the ground and represented here in the shape of a diode 10. When the voltage Vpp reaches a value higher than the breakdown voltage of the PN junction, the latter becomes on by avalanche effect. The number of diodes to be provided in series depends on their breakdown voltage and on the maximum value Vppmax sought. As a reverse-biased PN junction generally has a breakdown voltage in the order of 17V, a single diode can allow the voltage Vpp applied to memory cells to be limited between 15 and 20V.

In a MOS or CMOS integrated circuit, the diode 10 is, in reality, a diode-arranged MOS transistor, that is a transistor having its gate linked to its drain or to its source (depending on whether it is a PMOS or NMOS transistor). Now, a diode transistor has the disadvantage that its breakdown voltage varies with time, since electric charges supplied by the avalanche current are trapped in the gate oxide of the diode transistor. This phenomenon is generally designated junction "Roll-off", and occurs after quite a small number of breakdowns, generally below 100, since the limiting current that passes through the diode transistor is often quite high, from several tens to several hundreds of microamperes.

Certain manufacturers of integrated circuits adapt to this spurious effect but it results in a substantial imprecision as far as the voltage for triggering the PN junction limiting devices is concerned, which tends to increase with time. Now, it is likely that this imprecision is the cause of the mediocre service life of certain memories in integrated circuits, the memory cells of which receive voltage Vpp peaks that are increasingly higher as the degradation of the breakdown voltage of the PN junction of their voltage-limiting devices increases.

BRIEF SUMMARY OF THE INVENTION

Therefore, the present invention aims to provide a small-sized voltage-limiting device based on the principle of a PN junction breakdown, but which offers a breakdown voltage that is stable over time and not very subject to the above-mentioned Roll-off phenomenon.

For that purpose, one idea of the present invention is to provide a switch in parallel with the PN junction, and to switch this switch into the on state when the PN junction becomes conductive so as to send the limiting current into the switch. For that purpose, the PN junction is linked to a load in series that reduces the intensity of the avalanche current and that forces almost all the limiting current to pass in the switch. Thus the build-up of electric charges in an oxide of the PN junction is prevented.

Therefore, one embodiment of the present invention provides an integrated circuit comprising a voltage generator supplying a determined voltage, and a voltage-limiting circuit arranged at the output of the voltage generator, the voltage-limiting circuit comprising at least one PN junction formed by a diode-arranged MOS transistor, said PN junction having a breakdown voltage defining a threshold for triggering the voltage-limiting circuit as from which the PN junction is on by avalanche effect, at least one load in series with the PN junction, for limiting an avalanche current passing through the PN junction when the PN junction is on, and at least one switch in parallel with the PN junction and the load, arranged for being in the open state when the PN junction is off and in the closed state when the PN junction is on.

According to one embodiment, the load is chosen such that the avalanche current passing through the PN junction is at least two times lower than a current passing through the switch when the voltage-limiting circuit is triggered.

According to one embodiment, the load comprises a MOS transistor.

According to one embodiment, the switch comprises a MOS transistor.

According to one embodiment, the switch comprises an NMOS transistor the gate of which is linked to one terminal of the PN junction through an inverter.

According to one embodiment, the switch comprises a PMOS transistor the gate of which is connected to one terminal of the PN junction.

According to one embodiment, the switch comprises a MOS transistor, the load comprises a MOS transistor, the MOS transistor of the switch is current-mirror arranged with the MOS transistor of the load.

According to one embodiment, the voltage generator is a booster circuit.

According to one embodiment, the integrated circuit according to the invention comprises a circuit for delivering a halt signal for stopping the voltage generator when the voltage-limiting circuit is triggered.

According to one embodiment, said circuit for delivering a halt signal comprises an inverting circuit the input of which is linked to one point of the voltage-limiting circuit, and a logic gate having one input linked to the output of the inverting circuit, the logic gate adapting the voltage of the logic signal, from a voltage to be regulated present in the limiting circuit to a logic signal voltage.

BRIEF DESCRIPTION OF THE DRAWINGS

These and other objects, features and advantages of the present invention will be explained in greater detail in the following description of various examples of embodiments of voltage-limiting devices according to the present invention, given in relation with, but not limited to the following Figures.

DETAILED DESCRIPTION OF THE INVENTION

Figure 1:
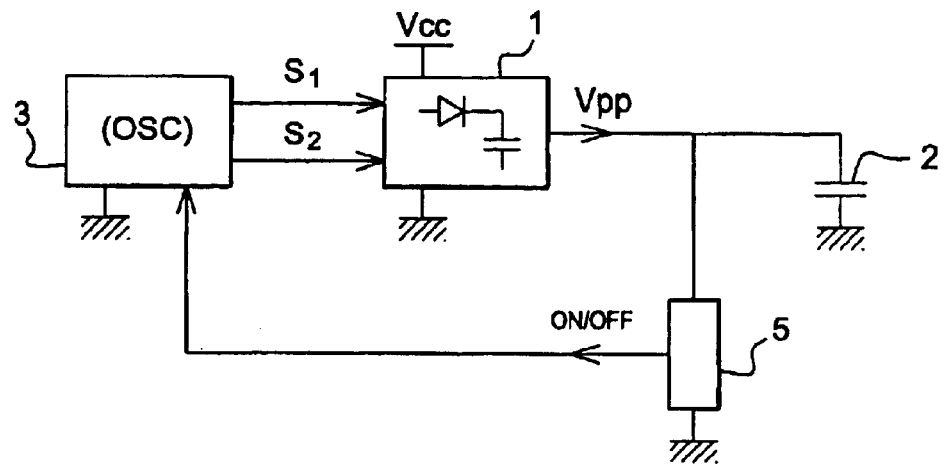
FIG. 1 described above schematically represents a charge pump fitted with a classical voltage regulator, FIG. 2 described above represents a charge pump fitted with a classical Zener diode voltage-limiting device, FIG. 3 described above represents a charge pump fitted with a classical junction breakdown voltage-limiting device.
Figure 2:
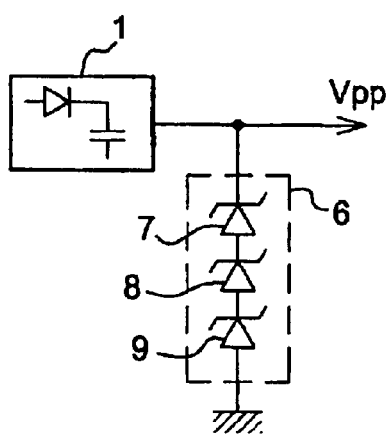
Figure 3:
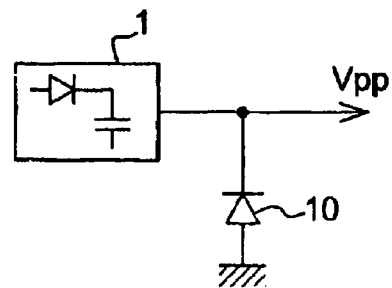
Figure 4:
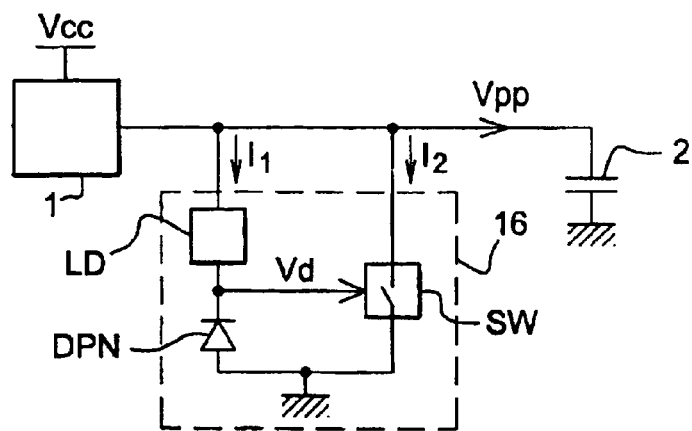
FIG. 4 is the schematic diagram of a voltage-limiting device according to one embodiment of the present invention.

Referring initially to FIG. 4, show therein is a schematic diagram of a voltage-limiting device 16 according to one embodiment of the present invention. The voltage-limiting device 16 is arranged in an integrated circuit, between the output of a booster circuit 1 and the ground. The booster circuit 1 is for example a charge pump powered by a voltage Vcc, supplying a voltage Vpp. The voltage Vpp is applied to a load 2, here a capacitive load representing as an example gate capacitances of memory cells to be erased or to be programmed.

The voltage-limiting device 16 comprises a trigger stage comprising a PN junction in series with a load LD with high series resistance. The PN junction is arranged in the reverse direction and is represented here in the shape of a diode DPN the anode of which is grounded (the diode being reverse arranged) and the cathode of which is linked to the output of the booster circuit 1 through the load LD.

The voltage-limiting device 16 also comprises a limiting stage in parallel with the trigger stage. The limiting stage comprises a switch SW with low series resistance arranged between the output of the booster circuit 1 and the ground. The switch SW is driven by a voltage Vd delivered by the trigger stage, the voltage Vd being for example taken off at the cathode of the diode DPN.

While the voltage Vpp is below the breakdown voltage of the diode DPN, that will be designated Vppmax, the diode remains off. The cathode voltage Vd copies the voltage Vpp and the switch SW is open (not on). When the voltage Vpp reaches the breakdown voltage, the diode DPN becomes on and the voltage Vd tends towards zero (ground). Almost immediately, the switch SW closes (becomes on) by short-circuiting the output of the booster circuit. When the voltage Vpp becomes lower than the breakdown voltage again, the diode returns to the off state and the switch SW opens again, such that the output of the booster circuit is once again insulated from the ground.

As a result of the foregoing design, almost all of a limiting current goes into the switch SW rather than into the diode DPN, as the series resistance of the switch SW is low compared to that of the load LD. This limiting current is mainly formed by the current discharged by the booster circuit, to which a discharge current delivered by the capacitive load 2 is possibly added.

Thanks to its capacity to drain current, the switch SW thus performs the voltage-limiting function, while the sole function of the trigger stage is to detect the threshold voltage Vppmax and to close the switch when this voltage is reached.

Therefore, when the voltage-limiting device is triggered, the PN junction is passed through by an avalanche current I1 very low as against a current I2 passing through the switch SW. The current I1, for example in the order of one nanoampere, is insufficient for injecting electric charges into the gate oxide of a MOS transistor susceptible of being used to form the diode DPN, which prevents the occurrence of the "Roll-off" effect.

So that the voltage-limiting device according to the present invention operates to satisfaction, a considerable amplification rate between the trigger stage and the limiting stage, and an almost immediate reaction of the limiting stage when the trigger stage becomes conductive must be provided. That way, the breakdown voltage of the PN junction remains stable over time, in identical conditions of use, even after hundreds of trigger cycles.

Figure 5:
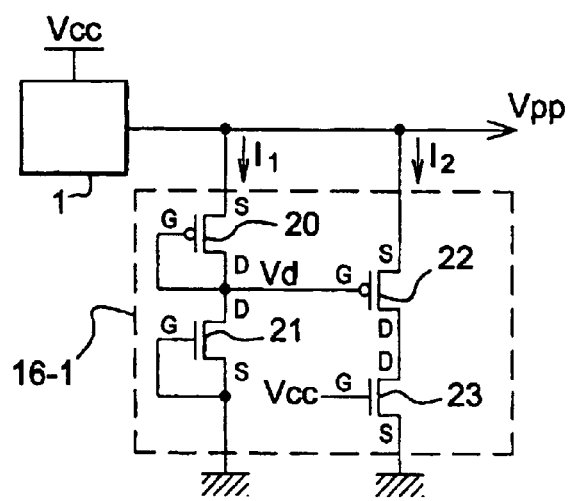
FIG. 5 represents a first example of an embodiment of a voltage-limiting device according to the present invention.

FIG. 5 represents a first example of an embodiment 16-1 of the voltage-limiting device according to the present invention.

The trigger stage comprises a PMOS transistor 20 in series with an NMOS transistor 21. The source of the transistor 20 receives the voltage Vpp and the drain of this transistor is linked to the drain of the transistor 21 the source of which is linked to the ground. The transistor 20 has its gate linked to its drain and the transistor 21 has its gate linked to its source. The transistor 20 operates in linear regime and forms the load LD represented in FIG. 4. The transistor 21 is diode-arranged and forms the diode DPN represented in FIG. 4.

The limiting stage comprises a PMOS transistor 22 and an NMOS transistor 23. The source of the transistor 22 receives the voltage Vpp and the drain of this transistor is linked to the drain of the transistor 23 the source of which is linked to the ground. The gate of the transistor 22 is linked to the drain of the transistor 21 and receives the voltage Vd. The gate of the transistor 23 receives a positive bias voltage lower than Vpp, such as the supply voltage Vcc for example. The transistor 22 forms the switch SW in FIG. 4 and has a high gate width-to-length ratio W/L, which guarantees a low series resistance in the on state (Rdson). The transistor 23 is optional and is only provided for technical reasons, particularly to control the consumption of the circuit when the latter is inactive.

As the transistors 20 and 22 form a current mirror, the current I2 in the limiting stage is proportional to the current I1 in the trigger stage when the diode transistor 21 is on. The ratio K=I2/I1 is fixed by the relative dimensions of the transistors 20, 22, and more particularly by the W/L ratio (gate width-to-length) of each of these transistors. The W/L ratio of the transistor 20 is preferably lower than 1 and low as against that of the transistor 22, which is preferably higher than 10. In this case, the ratio K is high—higher than 100 or even more—which guarantees that the current I1 remains very low when the limiting current to be drained is high (the limiting current thus being essentially equal to the current I2).

However, a low K ratio, such as higher than or equal to 2 for example, can be sufficient depending on the conditions of operation. Indeed, in addition to reducing the intensity of the avalanche current passing through the PN junction, the voltage-limiting device according to the present invention also allows the duration of the avalanche current to be reduced and this duration is a pertinent parameter as far as the injection of spurious charges into the PN junction is concerned, due to the classical relation Q=It (I being the current, t the time, and Q the electric charge). The total electric charge Q passing through the PN junction during a limitation action is therefore lower not only due to the limitation of the parameter "I" but also due to the limitation of the parameter "t". Furthermore, a K ratio of low value can also suffice when the triggering of the voltage-limiting device is accompanied by an action of regulating the booster circuit (for example by applying an on/off signal as will be described below) or even when the booster circuit is of low power, etc. Also, the K ratio must be chosen according to the triggering rapidity of the limiting stage.

When the voltage Vpp becomes equal to the breakdown voltage Vppmax of the PN junction of the diode transistor 21, the latter becomes on and the voltage Vd tends towards 0. The transistor 22 has its gate pulled to the ground and becomes on. The transistor 22 is then run through by a current I2 equal to K times the current I1.

As an example, a voltage-limiting device according to the present invention produced in a MOS integrated circuit of 0.5-micrometer technology (minimum dimension of a transistor gate) can drain a limiting current in the order of a few hundreds of microamperes when a voltage Vppmax in the order of 15V is reached. This limiting current is essentially the current I2 in the limiting stage, the current I1 in the trigger stage being in the order of a few nanoamperes. The current I1 is therefore insufficient to cause an injection of electric charges into a gate oxide. The trigger voltage Vppmax of the voltage-limiting device according to the present invention thus remains substantially constant over time, in identical conditions of use.

Figure 6:
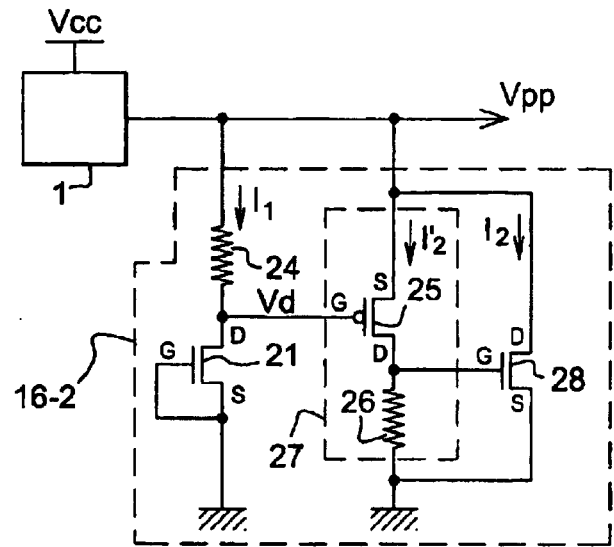
FIG. 6 represents a second example of an embodiment of a voltage-limiting device according to the present invention.

FIG. 6 shows a second example of an embodiment 16-2 of the voltage-limiting device according to the present invention. In the trigger stage the diode transistor 21 is present again but the load LD is here a resistance 24 of high value linking the output of the booster circuit 1 to the drain of the diode transistor 21.

The limiting stage here comprises a PMOS transistor 25 the source of which receives the voltage Vpp and the drain of which is linked to the ground through a resistance 26 of high value. The limiting stage also comprises an NMOS transistor 28 in parallel with the transistor 25 and the resistance 26. The transistor 28 receives the voltage Vpp at its drain, its source is connected to the ground and its gate is linked to the drain of the transistor 25.

The transistor 25 has a W/L ratio of low value and forms with the resistance 26 an inverter 27 with low current consumption, the input of which is the gate of the transistor 25. The transistor 28 forms the switch SW in FIG. 4 and preferably has a W/L ratio of high value, for reasons expounded and discussed above. The output of the inverter 27 is formed by the drain of the transistor 25 and drives the switch transistor 28.

The value of the resistance 24 forming the load LD of the diode transistor 21 is chosen according to the maximum value sought for the avalanche current I1. This resistance is at least of some tens of MΩ to obtain a current I1 in the order of a few nanoamperes.

While the voltage Vpp has not reached the breakdown voltage Vppmax of the PN junction of the diode transistor 21, the input of the inverter 27 receives the voltage Vpp. The output of the inverter 27 is on 0 (ground) and the switch transistor 28 is off. When the voltage Vppmax is reached and the diode transistor 21 becomes on, the transistor 25 also becomes on since its source-gate voltage becomes higher than its threshold voltage Vt. The output of the inverter 27 then supplies the voltage Vpp at the gate of the switch transistor 28 that itself becomes on. The transistor 28 drains the limiting current I2 of the voltage Vpp, which is, as above, much higher than the current I1 passing through the trigger stage. A current I2' passing through the inverter 27 is also negligible as against the current I1.

In this second embodiment, an NMOS transistor can be used as a voltage-limiting switch. This type of transistor is smaller in size than a PMOS transistor for an equivalent current passing through its channel. As the PMOS transistor 25 does not need to conduct a strong current, its W/L ratio is small as indicated above and its size is negligible.

Figure 7:
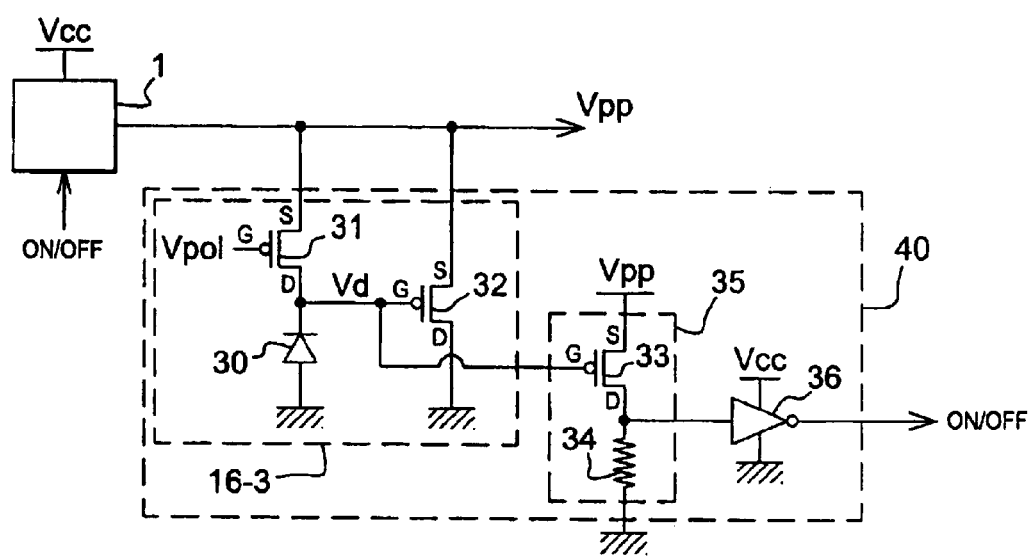
FIG. 7 represents a third example of an embodiment of a voltage-limiting device according to the present invention and also shows an application of the present invention to voltage regulation.

FIG. 7 represents a third example of an embodiment 16-3 of a voltage-limiting device according to the present invention, forming a regulator of on-off type.

The trigger stage of the limiting device 16-3 comprises as above a diode 30 arranged in the reverse direction, linked to the output of the booster circuit 1 through a PMOS transistor 31. The transistor 31 has a W/L ratio of low value and forms the load LD in FIG. 4. The gate of the transistor 31 is here biased by a reference voltage VPOL intended to impose a determined current in the trigger stage when the latter is on, the transistor 31 thus forming a resistive source of current. The diode 30 is of any known type, such as a MOS transistor PN junction, a diode obtained according to the technology of bipolar transistors for example, etc., the present embodiment not necessarily aiming to overcome the junction Roll-off.

The limiting stage comprises a PMOS transistor 32 the gate of which is driven by the voltage Vd taken off at the cathode of the diode 30. The transistor 32 receives the voltage Vpp at its source and its drain is here directly linked to the ground, but could also be so connected through an NMOS transistor, as in the case of the transistor 22 described above.

The operation of the voltage-limiting device 16-3 is virtually the same as that of the previous embodiments and will not be described again.

According to the present invention, the voltage Vd taken off at the cathode of the diode 30 is also applied to the control gate of a transistor 33 of PMOS type the source of which receives the voltage Vpp and the drain of which is linked to the ground through a resistance 34. The transistor 33 and the resistance 34 form an inverter 35 similar to the inverter 27 in FIG. 6. The output of the inverter (drain of the transistor 33) is applied to the input of an inverting gate 36 powered by the voltage Vcc, which forms a voltage Vpp/Vcc adapter. The gate 36 thus delivers a signal ON/OFF that is on 1 (Vcc) when the voltage Vd is equal to Vpp (voltage-limiting device 16-3 not active) and that is on 0 (ground) when the diode 30 is on (voltage-limiting device 16-3 active). This signal ON/OFF is used here as an on/off signal for the booster circuit 1, the latter being put off (or deactivated by removing the clock signals, in the case of a charge pump) when the signal ON/OFF is equal to 0.

The voltage-limiting device 16-3 thus forms, with the inverter 35 and the inverting gate 36, a regulator 40 that is small in size compared to classical regulators using Zener diodes in series.

It will be understood by those skilled in the art that other alternative embodiments of the present invention may be made. In particular, various combinations of the embodiments described above can be provided.

Thus, with reference to FIG. 4, the relative positions of the elements of the trigger stage can, in particular, be reversed, the load LD then being linked to the ground and the diode DPN linked to the output of the booster circuit 1. In this case, the voltage Vd for controlling the switch SW is taken off at the anode of the load LD and has a value opposite the voltage Vd previously described. This voltage Vd allows an NMOS switch transistor to be driven without using an inverter.

Furthermore, several PN junctions in series can be provided according to the value of the trigger voltage sought. These various PN junctions can be arranged before or after the load LD, or on either side of the load LD that can itself comprise several load elements. The limiting switch SW can itself comprise several switch elements in parallel or even in series if the voltage to be limited is very high and cannot be entirely borne by a single switch.

Various applications of the present invention may also be made. Although the description above set out to describe an application of the present invention to controlling the voltage Vpp for erasing and programming memory cells, various other applications can be provided, and the present invention is not exclusively dedicated to controlling a boosted voltage.

Finally, although initially provided to solve the problem of the degradation of the breakdown voltage of a PN junction due to the Roll-off effect, the present invention proposes a voltage-limiting device with a simple and high-performance architecture that may be embodied in various technologies.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An integrated circuit, comprising: a voltage generator supplying a determined voltage, and a voltage-limiting circuit arranged at the output of the voltage generator, the voltage-limiting circuit comprising:

at least one PN junction formed by a diode-arranged MOS transistor, said PN junction having a breakdown voltage defining a threshold for triggering the voltage-limiting circuit as from which the PN junction is on by avalanche effect, at least one load in series with the PN junction, for limiting an avalanche current passing through the PN junction when the PN junction is on, and at least one switch in parallel with the PN junction and the load, arranged for being in the open state when the PN junction is off and in the closed state when the PN junction is on.

2. The integrated circuit of claim 1 wherein the load is chosen such that the avalanche current passing through the PN junction is at least two times lower than a current passing through the switch when the voltage-limiting circuit is triggered.

3. The integrated circuit of claim 1 wherein the load comprises a MOS transistor.

4. The Integrated circuit of claim 1 wherein the switch comprises a MOS transistor.

5. The integrated circuit of claim 4 wherein the switch comprises an NMOS transistor, the gate of which is linked to one terminal of the PN junction through an inverter.

6. The integrated circuit of claim 4 wherein the switch comprises a PMOS transistor, the gate of which is connected to one terminal of the PN junction.

7. The integrated circuit of claim 1 wherein the switch comprises a MOS transistor, the load comprises a MOS transistor, the MOS transistor of the switch is current-mirror arranged with the MOS transistor of the load.

8. The integrated circuit of claim 1 wherein the voltage generator comprises a booster circuit.

9. The integrated circuit of claim 1, comprising a circuit for delivering a halt signal for stopping the voltage generator when the voltage-limiting circuit is triggered.

10. The integrated circuit of claim 9 wherein said circuit for delivering a halt signal comprises an inverting circuit, the input of which is linked to one point of the voltage-limiting circuit, and a logic gate having one input linked to the output of the inverting circuit, the logic gate adapting the voltage of the logic signal from a voltage to be regulated present in the limiting circuit to a logic signal voltage.

11. A voltage generator, comprising:
a voltage generator circuit having an output;
a load coupled to the output;
a diode structure having a first terminal coupled to the load at a node and a second terminal coupled to a reference potential; and
a switch coupled to the output and to the reference potential, the switch having a control terminal coupled to the node,
wherein the diode structure is configured to have a breakdown voltage, and the load is structured such that current passing through the diode structure is at least twice the current passing through the switch when the breakdown voltage is exceeded in the diode structure.

12. A voltage generator, comprising:
a voltage generator circuit having an output;
a first MOS transistor coupled to the output and to a node, the MOS transistor having a gate also coupled to the node;
a second MOS transistor coupled to the node and to a ground reference potential, the second MOS transistor having a gate coupled to the ground reference potential; and
a third MOS transistor coupled to the output and to a fourth MOS transistor, the third MOS transistor having a gate coupled to the node and the fourth MOS transistor coupled to the ground reference potential and having a gate coupled to a voltage source, the third MOS transistor is current-mirror arranged with the first MOS transistor.

13. The generator of claim 12 wherein the width-to-length ratio of the first MOS transistor is lower than 1, and the third MOS transistor has a width-to-length ratio greater than 10.

14. The generator of claim 12 wherein the first and second MOS transistors form a trigger stage and the third and fourth MOS transistors form a limiting stage, and further wherein the ratio of current flowing in the limiting stage is proportional to the current in the trigger stage in a range of 2-to-1 to 100-to-1.

15. A voltage generator, comprising:
a voltage generator circuit having an output;
a first resistive element coupled to the output and to a first node;
a first MOS transistor coupled to the resistor and a ground reference potential, the second MOS transistor having a gate coupled to the ground reference potential;
a second MOS transistor coupled to the output and to a second node, the second MOS transistor having a gate coupled to the first node;
a second resistive element coupled to the second node and to the ground reference potential; and
a third MOS transistor coupled to the output and to the ground reference potential and having a gate terminal coupled to the second node.

16. The generator of claim 15 wherein the first resistive element and the first MOS transistor form a trigger stage and the second MOS transistor, second resistive element, and third MOS transistor form a limiting stage, and wherein the ratio of current in the trigger stage to the current in the limiting stage is in the range of 2-to-1 to 100-to-1.

17. The generator of claim 15 wherein the first and third MOS transistors comprise NMOS transistors and the second MOS transistor comprises a PMOS transistor.

18. A voltage generator, comprising:
a voltage generator circuit having an output;
a first MOS transistor coupled to the output and to a first node and having a gate terminal coupled to a first voltage source;
a diode structure coupled to the first node and a ground reference potential;
a second MOS transistor coupled to the output and the ground reference potential and having a gate terminal coupled to the first node;
a third MOS transistor coupled to the output and to a second node and having a gate terminal coupled to the first node;
a first resistive element coupled to the second node and to the ground reference potential; and
an inverter coupled to the second node and having an output terminal.

19. The generator of claim 18 wherein the output terminal is coupled to the generator circuit to shut off the generator circuit when the breakdown voltage of the first MOS transistor is exceeded.

20. A voltage generator, comprising:
a voltage generating circuit adapted to generate an output voltage on an output thereof;
a trigger stage coupled between the output and a reference potential, the trigger stage configured to couple the output to the reference potential when the output voltage reaches a breakdown voltage, the trigger stage comprising a PN junction that conducts an avalanche current when the breakdown voltage is reached at the output; and
a limiting stage coupled between the output and the reference potential and to the trigger stage, the limiting stage limiting current in the trigger stage when the output voltage reaches the breakdown voltage.

21. The generator of claim 20 wherein the limiting circuit comprises a switch that is turned on when the PN junction conducts, the switch configured to conduct a current greater than the avalanche current.

22. A voltage generator, comprising:
a voltage generating circuit adapted to generate an output voltage on an output thereof;
a trigger stage coupled between the output and a reference potential, the trigger stage configured to couple the output to the reference potential when the output voltage reaches a breakdown voltage;
a limiting stage coupled between the output and the reference potential and to the trigger stage, the limiting stage limiting current in the trigger stage when the output voltage reaches the breakdown voltage; and
a circuit for generating an off signal to the voltage generating circuit when the PN junction conducts the avalanche current and for generating an on signal to the voltage generating circuit when the PN junction does not conduct the avalanche current.

23. A method for regulating a voltage generator having a voltage generating circuit adapted to generate a determined voltage on an output, the method comprising:
providing a PN junction and a load coupled in series between the output and a reference potential that conduct an avalanche current when voltage on the output reaches a breakdown voltage of the PN junction;
turning on a switch, which is coupled in parallel with the series-connected PN junction and load between the reference potential and the output, when the PN junction conducts the avalanche current to limit the avalanche current in the PN junction so that the avalanche current is at least two times lower than current flowing through the switch, and turning off the switch when the PN junction does not conduct the avalanche current; and generating an off signal to the voltage generating circuit from an on/off signal generating circuit when the PN junction conducts avalanche current and generating an on signal to the voltage generating circuit when the PN junction is not conducting an avalanche current.

24. A method for regulating a voltage generator having a voltage generating circuit adapted to generate a determined voltage on an output, the method comprising:

providing a PN junction and a load coupled in series between the output and a reference potential that conduct an avalanche current when voltage on the output reaches a breakdown voltage of the PN junction;

turning on a switch, which is coupled in parallel with the series-connected PN junction and load between the reference potential and the output, when the PN junction conducts the avalanche current to limit the avalanche current in the PN junction so that the avalanche current is at least two times lower than current flowing through the switch, and turning off the switch when the PN junction does not conduct the avalanche current; and providing the switch to have a width-to-length ratio such that the switch conducts greater current than the avalanche current in the PN junction.

25. The method of claim 24 wherein providing the PN junction and providing the switch comprises configuring the PN junction and configuring the switch such that the ratio of current in the switch to the avalanche current is in the range of 2-to-1 to 100-to-1.

* * * * *